(12) United States Patent
Wu

(10) Patent No.: US 9,273,680 B2
(45) Date of Patent: Mar. 1, 2016

(54) FLOOR PUMP CAPABLE OF TRANSMITTING AIR PRESSURE VALUE VIA WIRELESS TRANSMISSION TO MOBILE ELECTRONIC DEVICE FOR INDICATION

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 186 days.

(21) Appl. No.: 14/093,581

(22) Filed: Dec. 2, 2013

(65) Prior Publication Data

US 2015/0110646 A1 Apr. 23, 2015

(30) Foreign Application Priority Data

Oct. 18, 2013 (TW) .............................. 102137834 A

(51) Int. Cl.
*F04B 33/00* (2006.01)
*B60C 23/00* (2006.01)
*G01L 17/00* (2006.01)
*F04B 33/02* (2006.01)

(52) U.S. Cl.
CPC .............. *F04B 33/005* (2013.01); *B60C 23/002* (2013.01); *F04B 33/00* (2013.01); *G01L 17/00* (2013.01); *F04B 33/02* (2013.01)

(58) Field of Classification Search
CPC ........ F04B 33/00; F04B 33/005; F04B 33/02; B60C 23/002; G01L 17/00
USPC .................................... 417/63; 73/146, 146.3
See application file for complete search history.

(56) References Cited

U.S. PATENT DOCUMENTS

| 6,676,390 B2 * | 1/2004 | Wang | 417/528 |
| 6,978,636 B2 * | 12/2005 | Motush et al. | 62/292 |
| 6,993,962 B1 * | 2/2006 | Ko | B60C 23/0408 |
| | | | 73/146.5 |
| 7,667,583 B2 * | 2/2010 | Petrucelli | 340/442 |
| 7,775,097 B1 * | 8/2010 | Huang | 73/146.3 |
| 2006/0293600 A1 * | 12/2006 | Wawro | A61B 5/02141 |
| | | | 600/490 |
| 2007/0044552 A1 * | 3/2007 | Huang | B60C 23/0496 |
| | | | 73/146.3 |
| 2010/0170043 A1 * | 7/2010 | Young et al. | 5/706 |
| 2012/0136537 A1 * | 5/2012 | Galasso et al. | 701/37 |

FOREIGN PATENT DOCUMENTS

JP     2006103498 A  *  4/2006

OTHER PUBLICATIONS

English Translation of JP 2006103498.*

* cited by examiner

*Primary Examiner* — Nathan J Newhouse
*Assistant Examiner* — Connor Tremarche
(74) *Attorney, Agent, or Firm* — Alan D. Kamrath; Kamrath IP Lawfirm, P.A.

(57) ABSTRACT

A floor pump includes a base, a cylinder, a hose assembly, a valve assembly, a piston rod, and a pressure sensing device. The cylinder is mounted on the base. The hose assembly includes a hose, a nozzle, and a recess connected with each other. The valve assembly is mounted in the base and connected between the cylinder and the hose assembly. The piston rod is connected with a piston reciprocable inside the cylinder. The pressure sensing device is disposed in the recess and interconnected with the valve assembly. The pressure sensing device can measure the pressure value of the air flowing into the pressure sensing recess and is connectable with a mobile electronic device via wireless transmission for indicating the air pressure value.

13 Claims, 8 Drawing Sheets

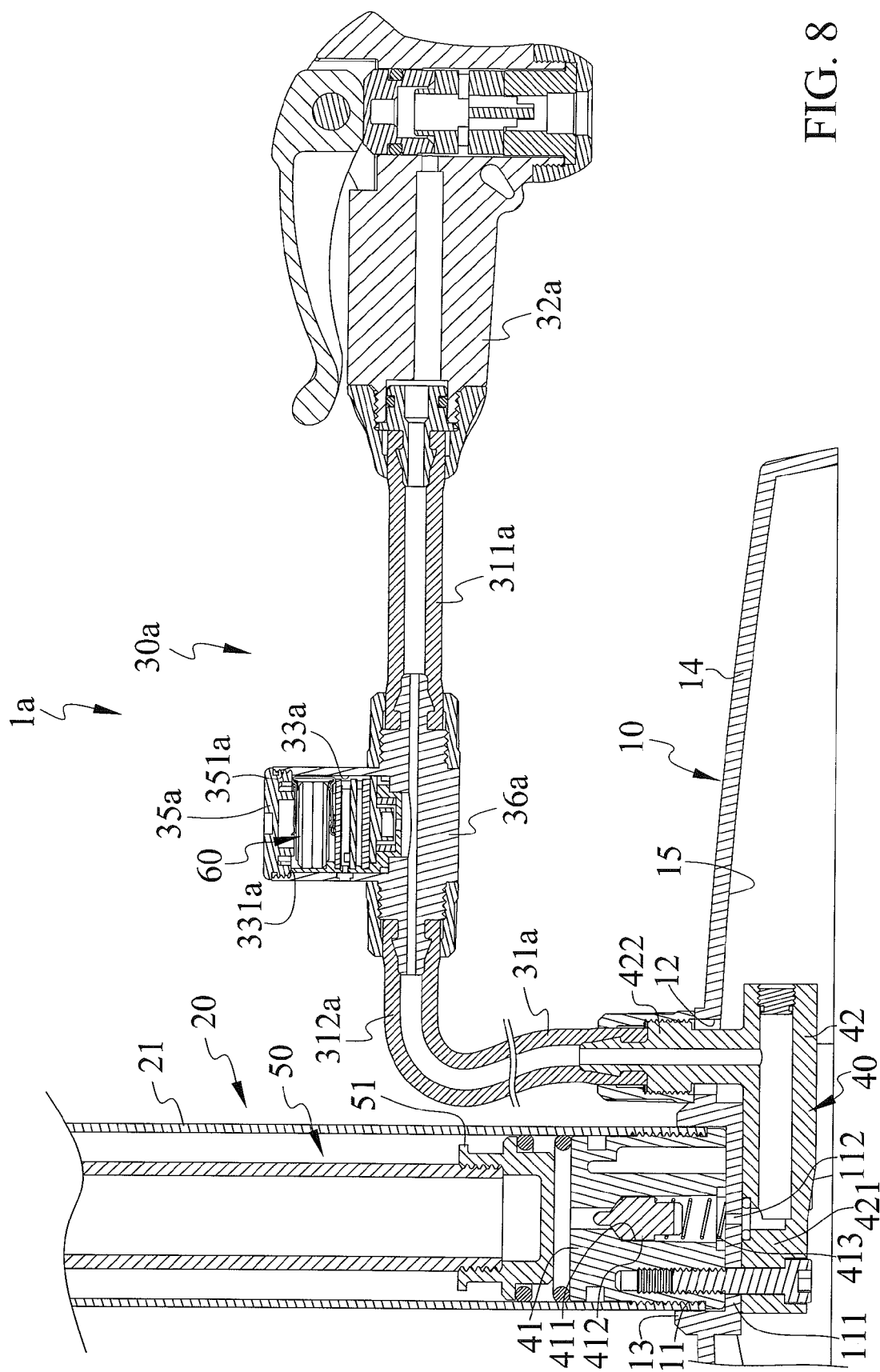

FLOOR PUMP CAPABLE OF TRANSMITTING AIR PRESSURE VALUE VIA WIRELESS TRANSMISSION TO MOBILE ELECTRONIC DEVICE FOR INDICATION

BACKGROUND OF THE INVENTION

1. Field of the Invention

The present invention relates to a floor pump and, in particular, to a floor pump that can measure the air pressure value of an inflatable and then transmit the value measured thereby via wireless transmission to a mobile electronic device for indicating the air pressure value of the inflatable immediately.

2. Description of the Related Art

Formerly, bicycles are employed for transportation, bicycle commuting, and utility cycling. As time advances, the use of bicycles gradually changes from vehicles to fitness equipment. Bicycles can be categorized in different ways: such as by function, by number of riders, by general construction, by gearing or by manner of propulsion. The more common types include utility bicycles, mountain bicycles, racing bicycles, touring bicycles, hybrid bicycles, cruiser bicycles, and BMX bikes. The price range for bicycles goes from as low as hundreds of dollars to as much as tens of thousands. Moreover, air pumps designed for inflating bicycle tires have had huge changes. The inflation pressure of bicycle tires ranges from below 30 PSI (2 BAR; 207 KPA) for tubeless mountain bike tires to 220 PSI (15 BAR; 1,517 KPA) for tubular track racing tires, so air pumps for inflating bicycle tires must have a pressure gauge for indicating the pressure values. Several basic types of air pumps for bikes are available, such as floor pumps and portable pumps. However, the shape of the floor pump is abrupt and inharmonious in order to mount a conventional mechanical pressure gauge. Thus, the scale and unit on the gauge will be very small, making it hard to indicate the air pressure value accurately. Moreover, the pressure gauge is usually installed on the bottom of the floor pump. Thus, the distance between the eyes of users and the gauge is quite far, making it difficult to see the pressure value. On the other hand, the pressure gauge also can be installed on the handle of the floor pump to reduce the distance between the eyes of users and the gauge, but the handle moves up and down during the pump operation. The pressure value is still hard to see.

The present invention is, therefore, intended to obviate or at least alleviate the problems encountered in the prior art.

SUMMARY OF THE INVENTION

In view of the foregoing disadvantages inherent in the known types of portable air pumps now present in the prior art, the present invention provides a floor pump includes a base, a cylinder, a hose assembly, a valve assembly, a piston rod, and a pressure sensing device. The cylinder is mounted on the base and has a chamber. The hose assembly includes a hose, a nozzle attachable with an inflatable, and a recess connected and in communication with each other. The valve assembly is mounted in the base and connected between the cylinder and the hose assembly. The piston rod is connected with a piston, which is slidably disposed and reciprocable inside the chamber for pushing air unidirectionally passing through the valve assembly and the hose assembly into the inflatable. The pressure sensing device is disposed in the recess and interconnected with the valve assembly. The pressure sensing device is arranged in an isobaric area formed between the hose assembly and the inflatable and includes a wireless transmission circuit board, a sensing unit, and a power supply unit. The sensing unit and the power supply unit are electrically connected with the wireless transmission circuit board. The sensing unit can measure the pressure value of the air flowing into the recess, and the wireless transmission circuit board is connectable with a mobile electronic device via wireless transmission for indicating the air pressure value.

The present invention resides not in any one of these features, but rather in the particular combination of all of them herein disclosed and claimed. The present invention is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting to the scope of the invention in any way.

An advantage of the floor pump according to the present invention is that the floor pump does not include a hypostatic pressure gauge to obtain a simple shape and a smaller volume to facilitate collection. Moreover, the floor pump is connectable with a mobile electronic device via wireless transmission for indicating the air pressure value, so that the indication of the air pressure value can zoom in or out on a screen of the mobile electronic device.

Other advantages and features of the present invention will become apparent from the following description referring to the drawings.

BRIEF DESCRIPTION OF THE DRAWINGS

The illustrative embodiments may best be described by reference to the accompanying drawings where:

FIG. 8 shows a partial, cross-sectional view of a floor pump in accordance with a second embodiment of the present invention.

Figure 1:
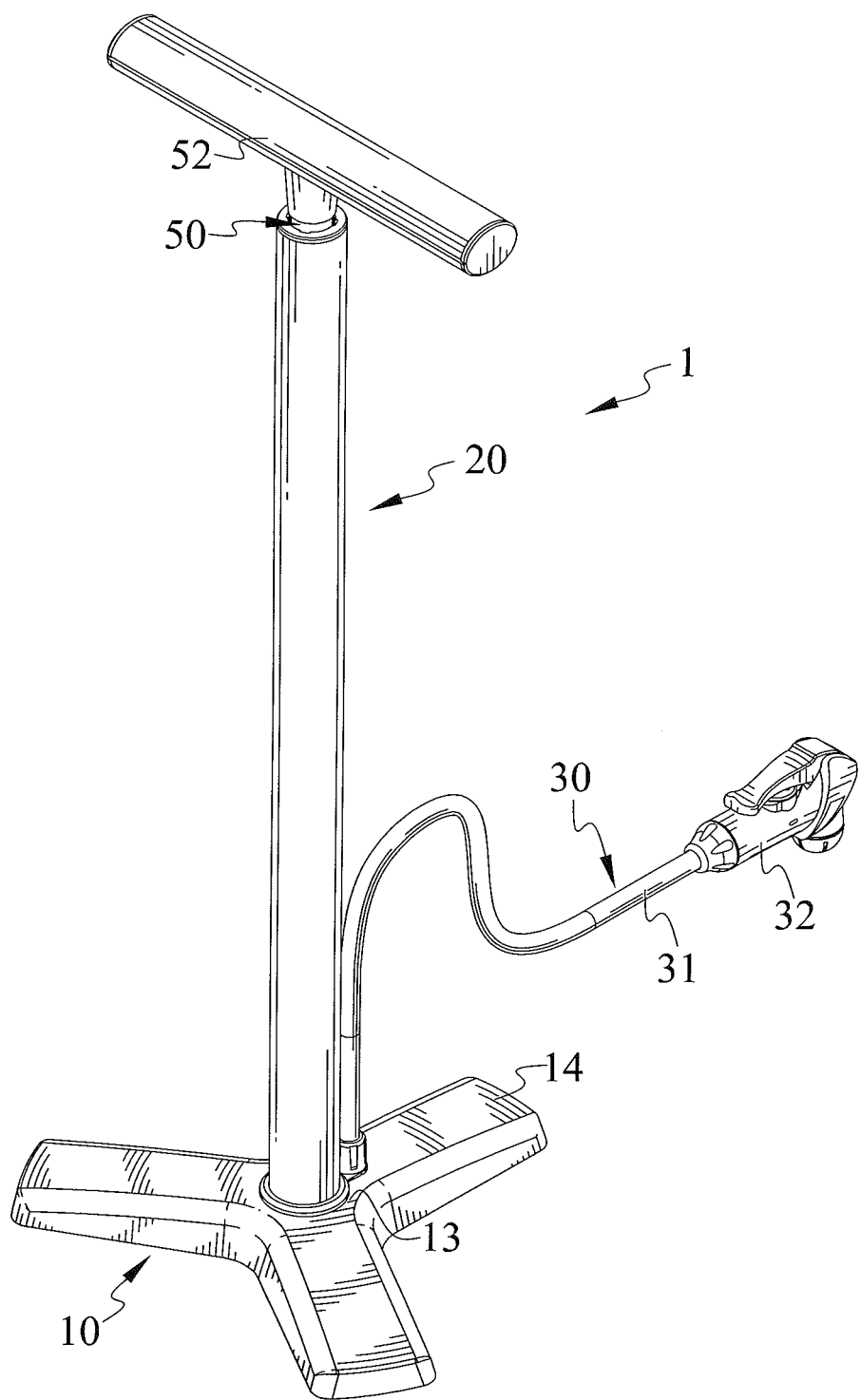
FIG. 1 shows a perspective view of a floor pump in accordance with a first embodiment of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

Figure 2:
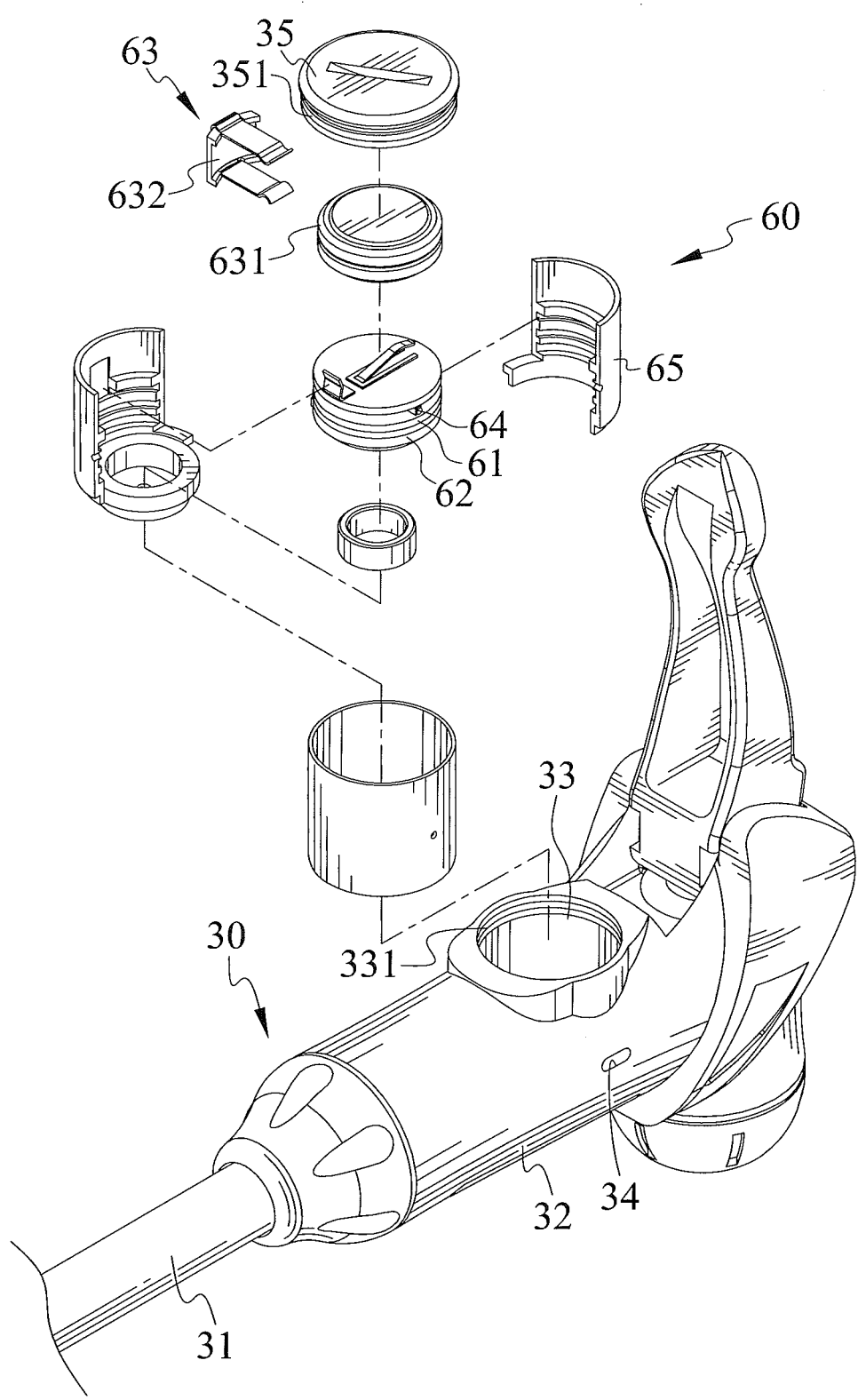
FIG. 2 shows a partial, exploded view of the floor pump of FIG. 1.
Figure 3:
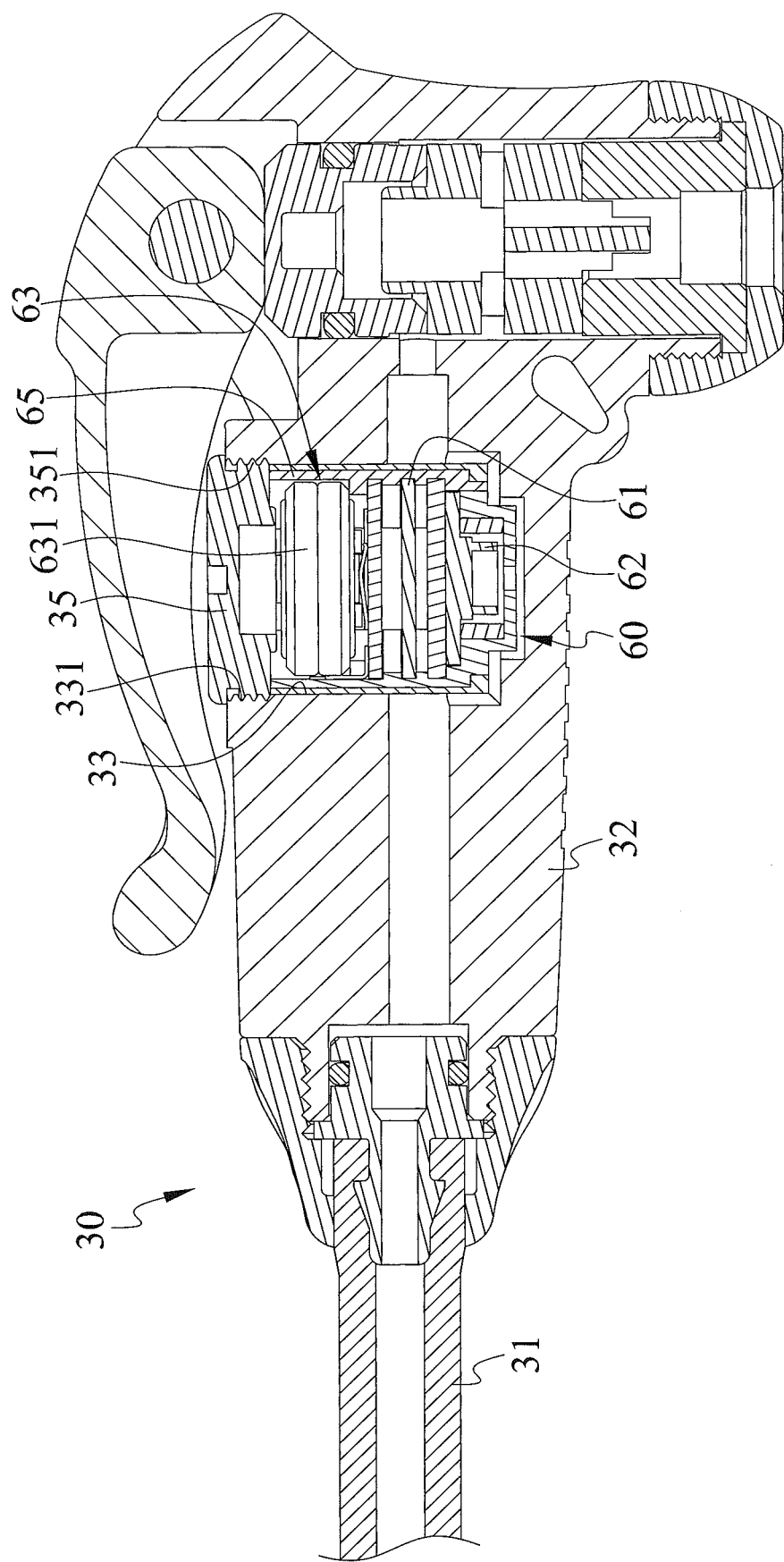
FIG. 3 shows a partial, cross-sectional view of the floor pump of FIG. 1.
Figure 4:
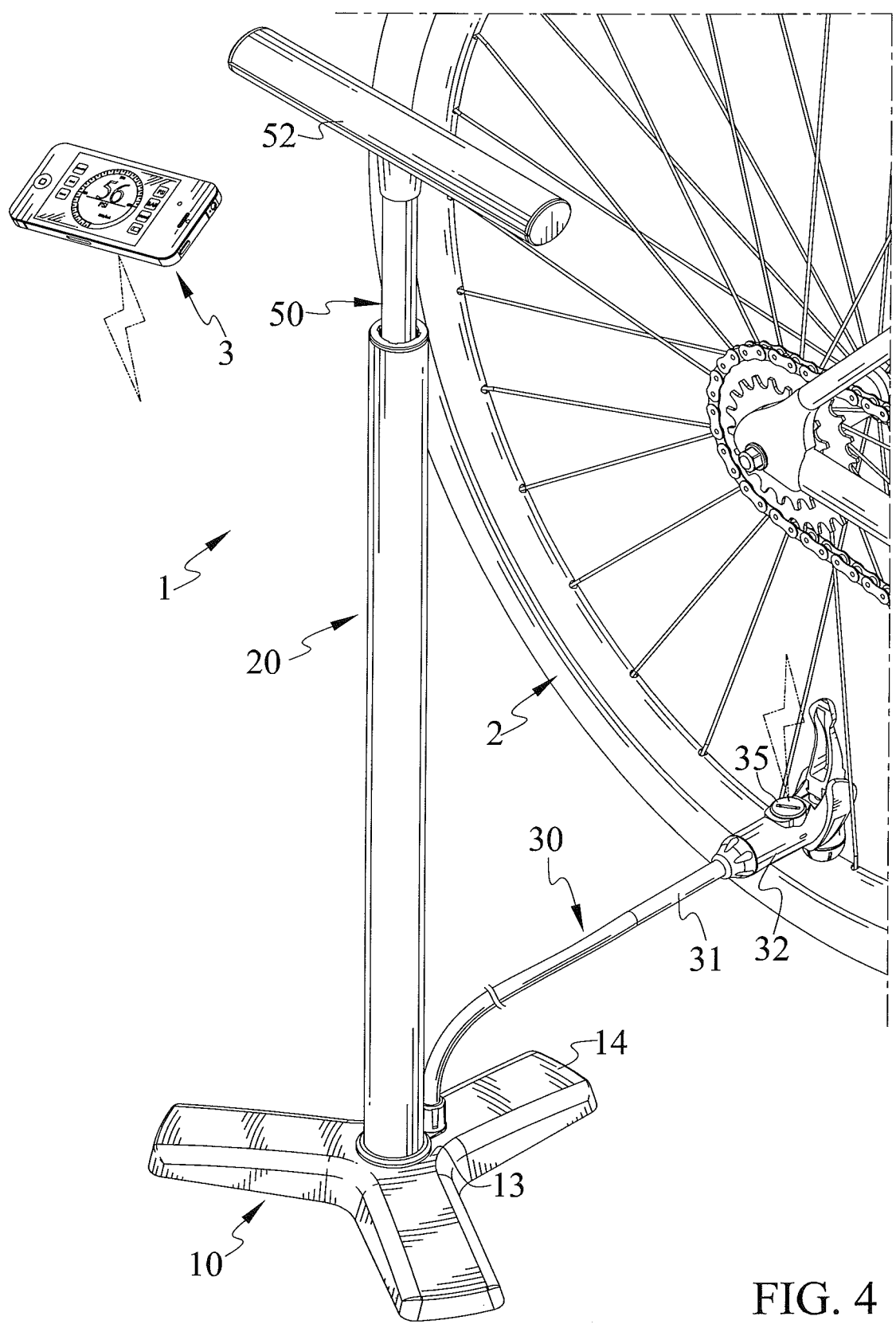
FIG. 4 shows a perspective view of the floor pump of FIG. 1 and illustrates a nozzle of the floor pump attaching with a tire, and a pressure sensing device sending signals to a mobile electronic device.
Figure 5:
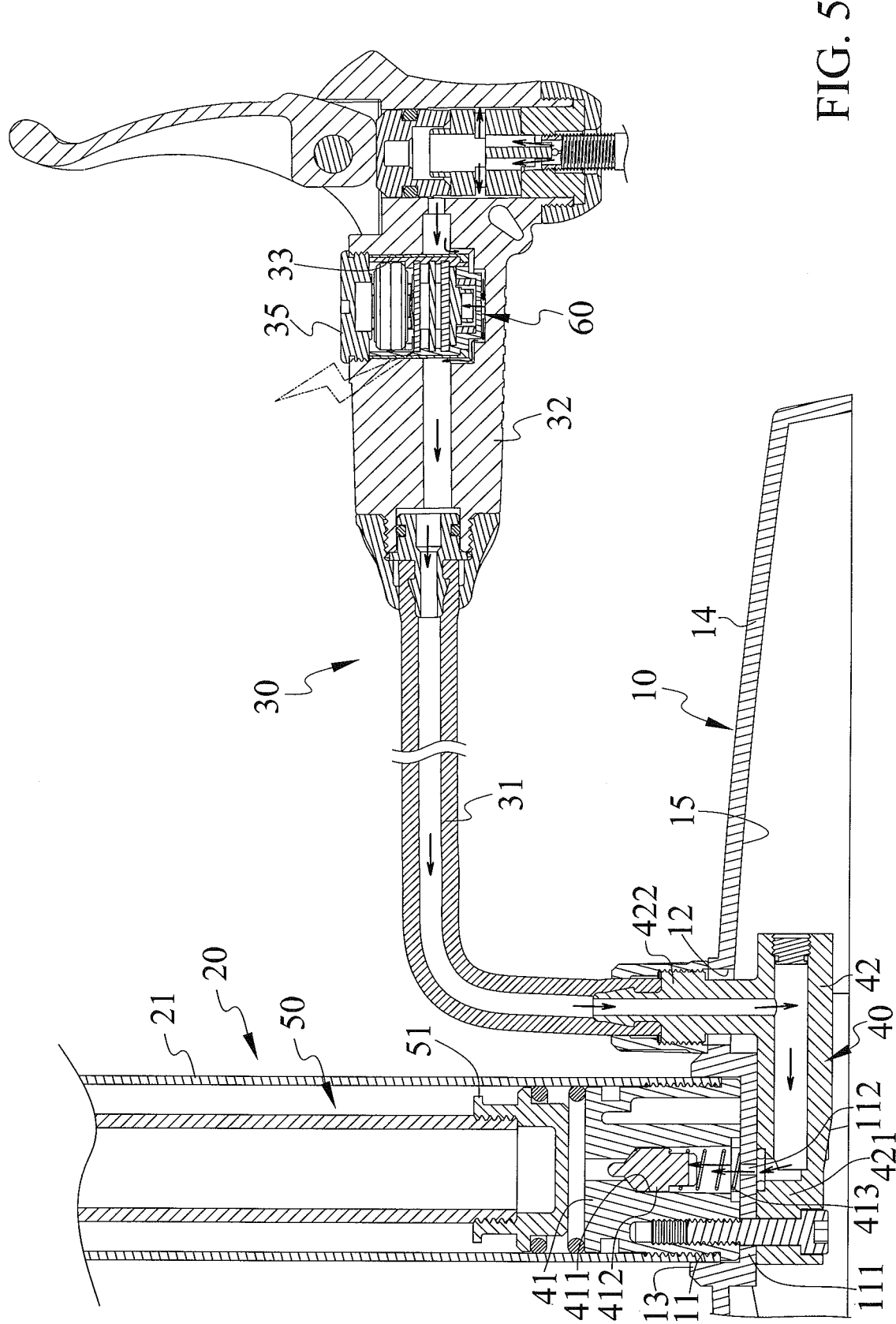
FIG. 5 shows a partial, cross-sectional view of the floor pump of FIG.
Figure 6:
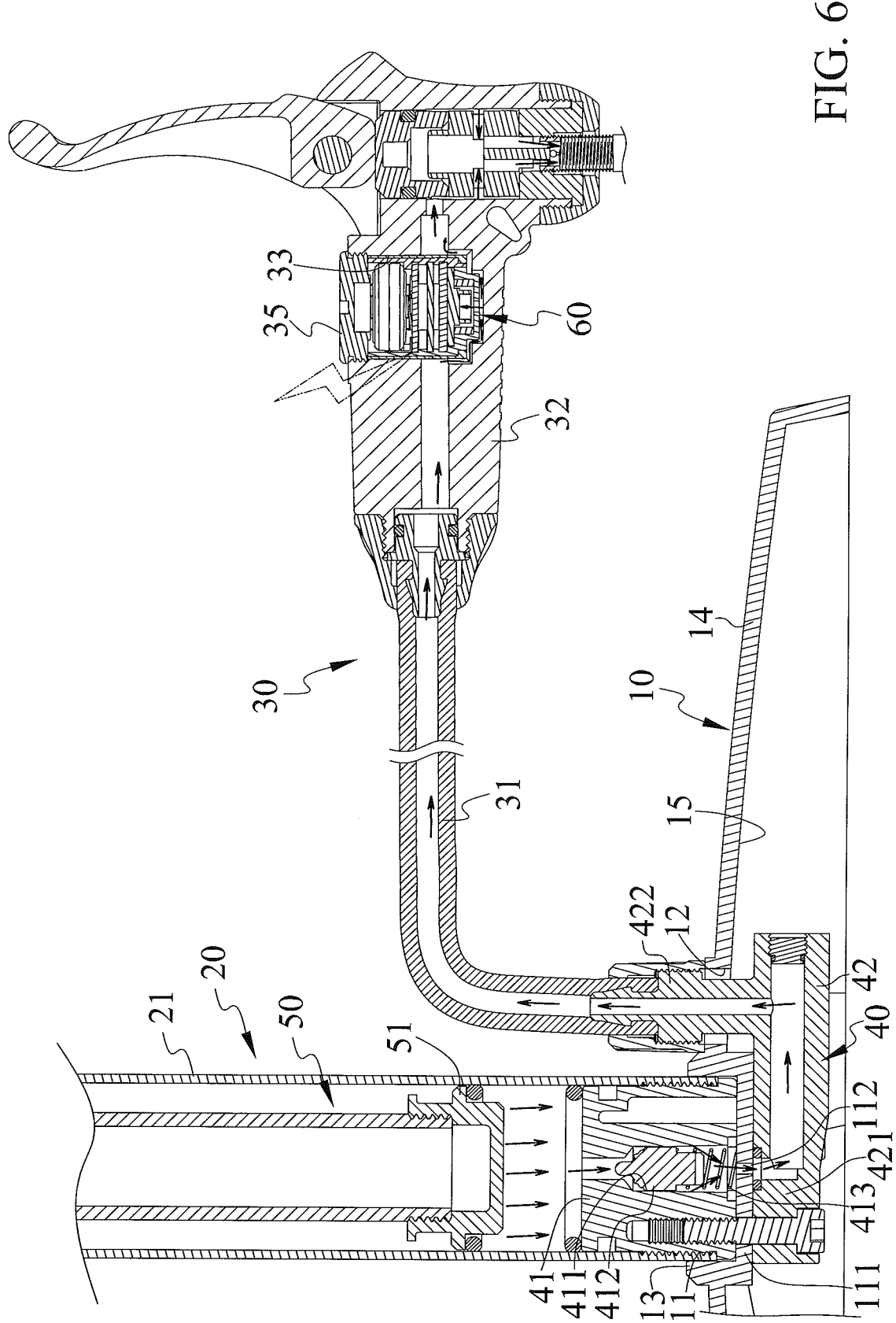
FIG. 6 shows a continued cross-sectional view of the floor pump of FIG. 5 and illustrates a piston reciprocating inside a cylinder.
Figure 7:
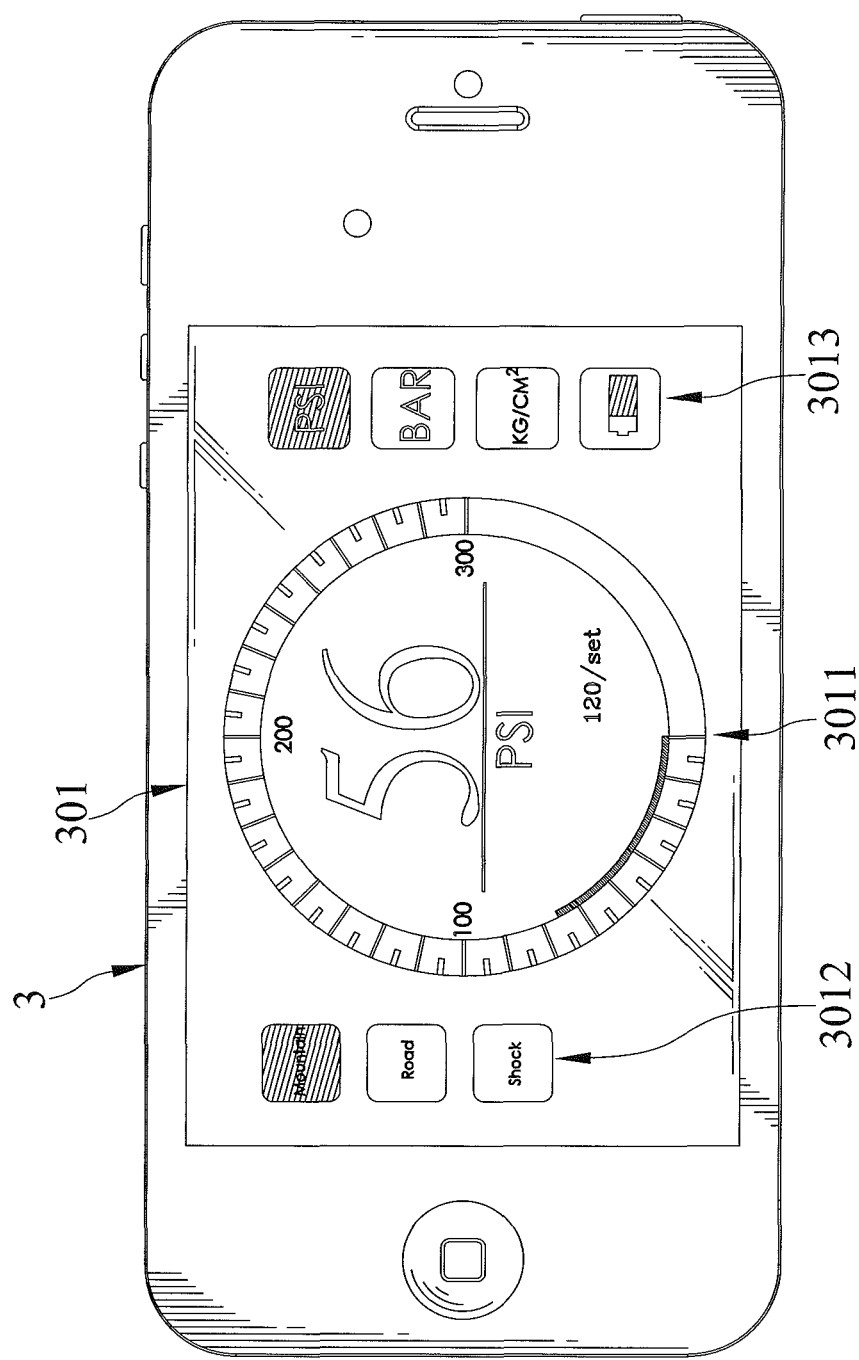
FIG. 7 shows a partial, enlarged view of the floor pump of FIG. 4 and illustrates a screen of the mobile electronic device displaying an image interface for indicating air pressure value of the inflatable.

FIGS. 1 through 7 show a floor pump 1 in accordance with a first embodiment of the present invention includes a base 10, a cylinder 20, a hose assembly 30, a valve assembly 40, a piston rod 50, and a pressure sensing device 60. The base 10 includes an assembling portion 11 formed on one end thereof. In the embodiment, the assembling portion 11 is a hole for assembling the cylinder 20 thereto. The cylinder 20 is mounted into the assembling portion 11 of the base 10 and has a chamber 21 axially extending through two opposite ends thereof. The hose assembly 30 includes a hose 31, a nozzle 32, and a recess 33 connected and in communication with each other, with the nozzle 32 attachable with an inflatable 2. In this embodiment, the inflatable 2 is a tire. Moreover, the recess 33 is formed at the nozzle 32 and includes a first connecting portion 331 formed around an inner periphery thereof. The hose assembly 30 further includes a cover 35, which includes a second connecting portion 351 engageable with the first connecting portion 331. In this embodiment, the first and second connecting portions 331 and 351 are screw threads. The valve assembly 40 is mounted in the base 10 and connected between the cylinder 20 and the hose assembly 30. One end of the piston rod 50 is connected with a piston 51, and the other end of the piston rod 50 is connected with a handle 52 adapted to be gripped by a user, so that the piston 51 is reciprocable inside the chamber 21 for pushing air unidirectionally passing through the valve assembly 40, the hose 31, and the nozzle 32 into the inflatable 2. The pressure sensing device 60 is disposed in the recess 33 of the hose assembly 30 and interconnected with the valve assembly 40. The pressure sensing device 60 is arranged in an isobaric area formed between the hose assembly 30 and the inflatable 2 and includes a wireless transmission circuit board 61, a sensing unit 62, and a power supply unit 63. The wireless transmission circuit board 61 is a Bluetooth circuit board. The sensing unit 62 and the power supply unit 63 are electrically arranged on the wireless transmission circuit board 61. The sensing unit 62 can measure the pressure value of the air flowing into the recess 33, and the wireless transmission circuit board 61 is connectable with a mobile electronic device 3 (e.g., smart phone, smart watch, tablet computer) via wireless transmission (e.g., Bluetooth connection, Wi-Fi connection) for indicating the air pressure value on a screen 301 of the mobile electronic device 3.

The base 10 includes a connecting hole 12 extending through the end adjacent to the assembling portion 11, and a groove 15 formed at the other end thereof. The assembling portion 11, the connecting hole 12, and the groove 15 are connected and in communication with each other.

The valve assembly 40 includes a valve 41 and a manifold 42. In the embodiment, the valve 41 is a one-way valve, and the manifold 42 is hollow. In another embodiment, the valve 41 and the manifold 42 also can be made in an integrative structure. The valve 41 is mounted in the assembling portion 11 of the base 10 and connected with one end of the cylinder 20 adjacent to the base 10. The manifold 42 is disposed in the groove 15 and includes first and second sections 421 and 422. The first section 421 is connected and in communication with the valve 41, and the second section 422 is exposed out of the connecting hole 12 to join with the hose 31.

The assembling portion 11 has a bottom 111, and a vent 112 extending through the bottom 111 and connected and in communication with the first section 421 of the manifold 42. The valve 41 is disposed in the bottom 111 and includes an orifice 411, a spacer 412, and a spring 413. One end of the orifice 411 is connected and in communication with the chamber 21, and the other end of the orifice 411 is connected and in communication with the vent 112. The spacer 412 is slidably disposed in the orifice 411. The spring 413 elastically abuts between the bottom 111 and the spacer 412, so that the chamber 21 and the vent 112 are unidirectionally in communication with each other.

The base 10 includes a supporting portion 13 and at least one supporting leg 14 radially extending from the supporting portion 13. In the embodiment, the base 10 includes three supporting legs 14 arranged in a Y shaped geometry. The assembling portion 11 is formed in the supporting portion 13. The groove 15 is formed in one of the three supporting legs 14.

The hose assembly 30 includes a through hole 34 interconnecting with the recess 33, and the wireless transmission circuit board 61 includes an indicator light 64 arranged in the corresponding position with the through hole 34. The indicator light 64 is actuatable as the wireless transmission circuit board 61 wirelessly connects with the mobile electronic device 3.

The pressure sensing device 60 further includes a case 65 disposed in the recess 33 and connected and in communication with the hose assembly 30. The wireless transmission circuit board 61, the sensing unit 62 and the power supply unit 63 are arranged in the case 65.

The power supply unit 63 includes at least one battery 631 and a clamp 632. In this embodiment, the power supply unit 63 includes two lithium batteries 631. The clamp 632 grips the two batteries 631 and is electrically connected with the wireless transmission circuit board 61.

When the nozzle 32 attaches with the inflatable 2, the inside of the inflatable 2, the nozzle 32, the recess 33, the manifold 42, the vent 112, and the orifice 411 are interconnected to form the isobaric area. Therefore, the sensing unit 62 measures the pressure value of the air flowing into the recess 33 and the case 65, and, then, the wireless transmission circuit board 61 connects with the mobile electronic device 3 via wireless transmission for indicating the air pressure value. Meanwhile, the indicator light 64 is actuated.

Moreover, the piston 51 is reciprocable inside the chamber 21 to push the air pressing against the spacer 412 moving in relation to the orifice 411 and the spring 413 to be compressed. Thus, the chamber 21, the vent 112, and the first section 421 of the manifold 42 are connected and in communication with each other. The air passes through the vent 112 and the first section 421 and flows into the second section 422. The air flowing into the second section 422 passes through the hose 31 and the nozzle 32 into the inflatable 2. Moreover, the air flowing into the recess 33 is measured by the sensing unit 62, and the wireless transmission circuit board 61 connects with the mobile electronic device 3 via wireless transmission.

The mobile electronic device 3 can receive a wireless signal sent from the wireless transmission circuit board 61 and includes a screen 301 adapted for displaying a supported mobile application corresponding with the wireless signal to indicate air pressure value of the inflatable 2 immediately. An image interface of the mobile application displayed on the screen 301 is divided into a pressure value display section 3011, a pump mode display section 3012, and a pressure unit display section 3013. The pressure value display section 3011 shows the air pressure value transmitted from the wireless transmission circuit board 61, and can simultaneously display both digital and analog display. The pump mode display section 3012 provides Mountain (short for mountain bike), Road (short for road bike), or Shock (short for shock absorber) modes to choose. The pressure unit display section 3013 provides a variety of units (e.g., PSI, BAR, $KG/CM^2$) to choose and shows the battery level.

FIG. 8 shows a floor pump 1a in accordance with a second embodiment of the present invention. The second embodiment is generally similar to the first embodiment, except that the hose assembly 30a further includes a cover 35a and a connecting member 36a. The hose 31a includes first and second sections 311a and 312a. The first section 311a is connected and in communication between the nozzle 32a and the connecting member 36a. The second section 312a is connected between the connecting member 36a and the manifold 42. The recess 33a is formed at the connecting member 36a and includes a first connecting portion 331a formed around an inner periphery thereof, and the cover 35a includes a second connecting portion 351a engageable with the first connecting portion 331a.

In view of the forgoing, it is an object of the present invention to provide floor pumps 1 not including a hypostatic pressure gauge to obtain a simple shape and a smaller volume to facilitate collection. Moreover, the floor pumps 1 is connectable with a mobile electronic device 3 via wireless transmission for indicating the air pressure value, so that the indication of the air pressure value can zoom in or out on a screen of the mobile electronic device.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A floor pump comprising:
a base including a supporting portion, at least one supporting leg, and an assembling portion formed in the supporting portion, with the at least one supporting leg radially extending from the supporting portion, with a groove formed in the at least one supporting leg; a cylinder mounted on the base and having a chamber; a hose assembly including a hose, a nozzle, and a recess connected and in communication with each other, with the nozzle attachable with an inflatable; a valve assembly mounted in the base and connected between the cylinder and the hose assembly; a piston rod connected with a piston, with the piston slidably disposed and reciprocable inside the chamber for pushing air unidirectionally passing through the valve assembly and the hose assembly into the inflatable: and a pressure sensing device disposed in the recess and interconnected with the valve assembly, with the pressure sensing device arranged in an isobaric area formed between the hose assembly and the inflatable and including a wireless transmission circuit board, a sensing unit, and a power supply unit, with the sensing unit and the power supply unit electrically connected with the wireless transmission circuit board, with the sensing unit capable of measuring an air pressure value of air flowing into the recess, and with the wireless transmission circuit board connectable with a mobile electronic device via wireless transmission for indicating the air pressure value, and wherein the base includes a connecting hole formed at one end thereof, with the assembling portion, the connecting hole and the groove connected and in communication with each other.

2. The floor pump as claimed in claim 1, wherein the wireless transmission circuit board is a wireless protocol circuit board capable of connecting to the mobile electronic device via the wireless protocol connection.

3. The floor pump as claimed in claim 1, wherein the valve assembly includes a valve and a manifold, with the valve mounted on the assembling portion and connected with one end of the cylinder adjacent to the base, with the manifold mounted in the groove and including first and second sections, with the first section connected and in communication with the valve, with the second section exposed out of the connecting hole to join with the hose.

4. The floor pump as claimed in claim 3, wherein the assembling portion has a bottom, with a vent extending through the bottom and connected and in communication with the first section of the manifold, with the valve disposed in the bottom and including an orifice, a spacer, and a spring, with one end of the orifice connected and in communication with the chamber, with another end of the orifice connected and in communication with the vent, with the spacer slidably disposed in the orifice, with the spring elastically abutting between the bottom and the spacer.

5. The floor pump as claimed in claim 1, wherein the hose assembly includes a through hole interconnecting with the recess, wherein the wireless transmission circuit board includes an indicator light arranged in the corresponding position with the through hole, wherein the indicator light is actuatable as the wireless transmission circuit board wirelessly connects with the mobile electronic device.

6. The floor pump as claimed in claim 1, wherein the recess is formed at the nozzle, with the recess having a first connecting portion formed around an inner periphery thereof, wherein the hose assembly further includes a cover, with the cover having a second connecting portion engageable with the first connecting portion.

7. The floor pump as claimed in claim 1, wherein the hose assembly further includes a cover and a connecting member, with the connecting member connected and in communication with the hose, wherein the recess is formed at the connecting member, with the recess having a first connecting portion formed around an inner periphery thereof, with the cover having a second connecting portion engageable with the first connecting portion.

8. The floor pump as claimed in claim 1, wherein the pressure sensing device further includes a case disposed in the recess and connected and in communication with the hose assembly, with the wireless transmission circuit board, the sensing unit and the power supply unit arranged in the case.

9. A combination of a floor pump and a mobile electronic device comprising:
- a base including a supporting portion, at least one supporting leg, and an assembling portion formed in the supporting portion, with the at least one supporting leg radially extending from the supporting portion, with a groove formed in the at least one supporting leg;
- a cylinder mounted on the base and having a chamber;
- a hose assembly including a hose, a nozzle, and a recess connected and in communication with each other, with the nozzle attachable with an inflatable;
- a valve assembly mounted in the base and connected between the cylinder and the hose assembly;
- a piston rod connected with a piston, with the piston slidably disposed and reciprocable inside the chamber for pushing air unidirectionally passing through the valve assembly and the hose assembly into the inflatable; and
- a pressure sensing device disposed in the recess and interconnected with the valve assembly, with the pressure sensing device arranged in an isobaric area formed between the hose assembly and the inflatable and including a wireless transmission circuit board, a sensing unit, and a power supply unit, with the sensing unit and the power supply unit electrically connected with the wireless transmission circuit board, with the sensing unit capable of measuring an air pressure value of air flowing into the pressure sensing device; and
- a mobile electronic device connectable with the wireless transmission circuit board via wireless transmission for indicating the air pressure value.

10. The combination as claimed in claim 9, wherein the wireless transmission circuit board is a wireless protocol circuit board capable of connecting to the mobile electronic device via the wireless protocol connection.

11. The combination as claimed in claim 9, wherein the hose assembly includes a through hole interconnecting with the recess, wherein the wireless transmission circuit board includes an indicator light arranged in the corresponding position with the through hole, wherein the indicator light is actuatable as the wireless transmission circuit board wirelessly connects with the mobile electronic device.

12. The combination as claimed in claim 9, wherein the recess is formed at the nozzle, with the recess having a first connecting portion formed around an inner periphery thereof, wherein the hose assembly further includes a cover, with the cover having a second connecting portion engageable with the first connecting portion.

13. The combination as claimed in claim 9, wherein the hose assembly further includes a cover and a connecting member, with the connecting member connected and in communication with the hose, wherein the recess is formed at the connecting member, with the recess having a first connecting portion formed around an inner periphery thereof, with the cover having a second connecting portion engageable with the first connecting portion.

* * * * *